(12) United States Patent
Zicker

(10) Patent No.: US 6,314,286 B1
(45) Date of Patent: Nov. 6, 2001

(54) CONTROL OF TELECOMMUNICATIONS SERVICES FOR SUBSCRIBER-PROVIDED RADIO COMMUNICATION DEVICES RESIDING IN A MINIATURE CELLULAR ENVIRONMENT

(75) Inventor: Robert G. Zicker, Roswell, GA (US)

(73) Assignee: GTE Wireless Service, Alpharetta, GA (US)

( * ) Notice: Subject to any disclaimer, the term of this patent is extended or adjusted under 35 U.S.C. 154(b) by 0 days.

(21) Appl. No.: 09/430,112

(22) Filed: Oct. 29, 1999

Related U.S. Application Data (63) Continuation of application No. 08/843,826, filed on Apr. 21, 1997, now Pat. No. 5,995,833.

(51) Int. Cl.[7] .............................. H04Q 7/20; H04Q 7/32; H04Q 7/36
(52) U.S. Cl. ..................... 455/422; 455/431; 455/66; 455/17; 455/524; 455/525; 455/432; 455/435; 455/517
(58) Field of Search .................................. 455/422, 431, 455/432, 433, 434, 435, 436, 437, 445, 66, 17, 517, 524, 525, 403

(56) References Cited

U.S. PATENT DOCUMENTS

| | | | |
|---|---|---|---|
| 5,123,112 | 6/1992 | Choate | 455/56.1 |
| 5,438,610 | 8/1995 | Bhagat et al. | 379/58 |
| 5,455,964 | 10/1995 | Roos et al. | 455/431 |
| 5,519,761 | 5/1996 | Gilhousen | 379/59 |
| 5,594,782 | 1/1997 | Zicker et al. | 379/63 |
| 5,956,639 | * 9/1999 | Armbruster et al. | 455/431 |
| 5,970,408 | * 10/1999 | Carlsson et al. | 455/431 |
| 6,047,165 | * 4/2000 | Wright et al. | 455/66 |
| 6,157,633 | * 12/2000 | Wright | 455/435 |

FOREIGN PATENT DOCUMENTS

WO94/08406 * 4/1994 (FI).

OTHER PUBLICATIONS

Concept of a GSM communication System for High Speed Trains, 07803–1927–3/94, IEEE, 1994, pp. 1130–1133, Mar. 1994.*

* cited by examiner

Primary Examiner—William Trost
Assistant Examiner—Keith Ferguson (57) ABSTRACT

Telecommunication services are provided to subscriber-provided radiotelephones (50) residing inside an aircraft (20). Telecommunication services are provided while the aircraft (20) is flying and utilize the aircraft's air-to-ground communication system (48) to access a radio communication link (34). Base stations (40) residing in aircraft (20) are configured to transmit at least two independent overhead control data pilot signals (54, 58) in response to instructions from a single controller (44). The control data pilot signals (54, 58) capture and control the subscriber-provided radiotelephones (50). Controlling methods are employed to force autonomous registration of radiotelephones (50) and to instruct radiotelephones (50) to transmit at minimum power levels.

7 Claims, 6 Drawing Sheets

CONTROL OF TELECOMMUNICATIONS SERVICES FOR SUBSCRIBER-PROVIDED RADIO COMMUNICATION DEVICES RESIDING IN A MINIATURE CELLULAR ENVIRONMENT

RELATED INVENTION

The present invention is a continuation of "CONTROL OF TELECOMMUNICATION SERVICES FOR SUBSCRIBER-PROVIDED RADIO COMMUNICATION DEVICES RESIDING IN A MINIATURE CELLULAR ENVIRONMENT" U.S. patent application Ser. No. 08/843,826 filed Apr. 21, 1997 now U.S. Pat. No. 5,995,833 which is incorporated by reference herein.

TECHNICAL FIELD OF THE INVENTION

The present invention relates generally to cellular radiotelephones. More specifically, the present invention relates to providing telecommunication services to subscriber-provided radiotelephones residing inside a vehicle such as a flying aircraft. In particular, the present invention relates to the simulation of a cellular network inside an aircraft to achieve radiotelephone connection with the public switched telephone network (PSTN).

BACKGROUND OF THE INVENTION

Cellular radiotelephones have become increasingly popular with users due in part to their convenience, greater area of coverage, and improved audio quality. In addition, increasing competition in the industry has created a climate where cellular radiotelephones have lost their stature as an instrument for the wealthy and have become affordable to the general public. As a result, greater numbers of people subscribe to cellular services and consequently carry subscriber-provided radiotelephones that may be borrowed, leased, or owned by the subscriber.

Due to the greater area of coverage and extended roaming agreements within the cellular industry, it has become practical and even necessary for subscribers to bring their radiotelephones with them while traveling. Thus, greater numbers of air travelers have their radiotelephones while flying. In accordance with current methodologies, an air traveler may be able to place a call from a subscriber-provided radiotelephone while the aircraft is on the ground prior to take-off and after landing, however, this capability does not extend to in-flight use.

The use of conventional cellular radiotelephones in-flight has not been allowed in part because the aircraft is flying through multiple cells supported by land-based cellsites. These land-based cellsites would most likely instruct radiotelephones to transmit at high power levels. These high power levels pose a danger of interference with standard aircraft transmissions and control.

To allow passengers in-flight to communicate with someone on the ground, many aircraft are equipped with air-to-ground communications systems. One currently existing system, known as Airfone®, uses a network of ground stations to provide telecommunications for a plurality of aircraft. Each ground station conducts communications with passengers on aircraft within its range, on specific FCC allocated radiofrequency channels, using one or more pilot channels and up to 31 additional voice channels that accompany each pilot channel. The pilot channels carry information necessary for an aircraft to select an optimal ground station as determined by its position and flight direction, and subsequently to utilize unoccupied voice channels associated with that ground station. Following ground station selection, the voice channels carry encoded conversations between the aircraft, through the selected ground station, to called numbers on landline networks.

Two types of telephone systems, cordless and corded, have been utilized inside the aircraft in air-to-ground communication systems. One telephone system includes cordless telephones located at paystations within the passenger cabin of the aircraft. In this type of telephone system, the passenger leaves his seat and walks to a paystation. Once the passenger is at the paystation, the passenger inserts his or her credit card into the paystation to activate the telephone system. The passenger may then return to his seat with the cordless telephone to place the call, while leaving his credit card in the paystation for validation and billing. Upon return of the cordless telephone, the passenger retrieves this credit card. While providing the passenger with the freedom to take the telephone back to his seat, this system may suffer from inferior signal quality. Additionally, passengers leaving their seats to retrieve telephones may increase the quantity of unrestrained passengers moving about in the cabin, which raises safety concerns. If the passenger is unable to leave his or her seat, the flight attendant could obtain the passenger's credit card, insert it in the paystation, and deliver the telephone to the passenger. However, this imposes additional responsibilities on already busy flight attendants. In addition, many credit card holders feel uncomfortable about relinquishing their credit card to someone else.

Another type of air-to-ground communication system utilizes corded telephones. These telephones are wired into the seatback of one of a set of two or three seats. Instead of the passenger moving to the paystation, the paystation has been moved to the passenger. This system results in better signal quality of the call. In addition, this system results in added passenger convenience and safety. However, a disadvantage of the corded telephone is the significant expense to wire up the seatbacks, as well as to functionally maintain the large number of corded telephones.

While the previously discussed systems provide a method for passengers to have air-to-ground communications during a flight, these systems do not support seat-to-seat communications. Seat-to-seat communications may be desired if two passengers who are not sitting together would like to speak with each other but are unable to move about in the cabin. In addition, the two passengers may want to jointly teleconference with someone at a ground site. Thus, there is a need for an improved method of providing telecommunication services to aircraft passengers that cost-effectively provides reliable signal quality, greater convenience to the passenger, and increased calling options.

SUMMARY OF THE INVENTION

Accordingly, it is an advantage of the present invention to furnish a method of providing telecommunication services to subscriber-provided radiotelephones residing inside an aircraft.

Another advantage of the present invention is to use existing subscriber-provided radiotelephones usable in ground-base cellular networks without modification to the subscriber-provided radiotelephones.

Another advantage of the present invention is to control radiotelephones residing in a vehicle such that the radiotelephones are transmitting at minimal power levels.

Another advantage of the present invention is to enable a passenger to place and receive telephone calls conveniently from a radiotelephone without the use of credit cards.

Another advantage of the present invention is to achieve a high quality telephone signal.

Another advantage of the present invention is to decrease the requirements for wired aircraft seatbacks.

In a network of cellular communication systems in which many subscriber-provided radiotelephones communicate over a wide area through a plurality of cellsites that share common communication channels, the above and other advantages of the present invention are carried out in one form by a method of providing telecommunication services within a vehicle. This method calls for establishing a cellsite inside of the vehicle, coupling the cellsite to a public switched telecommunication network (PSTN) through a radio communication link, and setting up a call with a subscriber-provided radiotelephone residing inside the vehicle through the cellsite and radio communication link.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
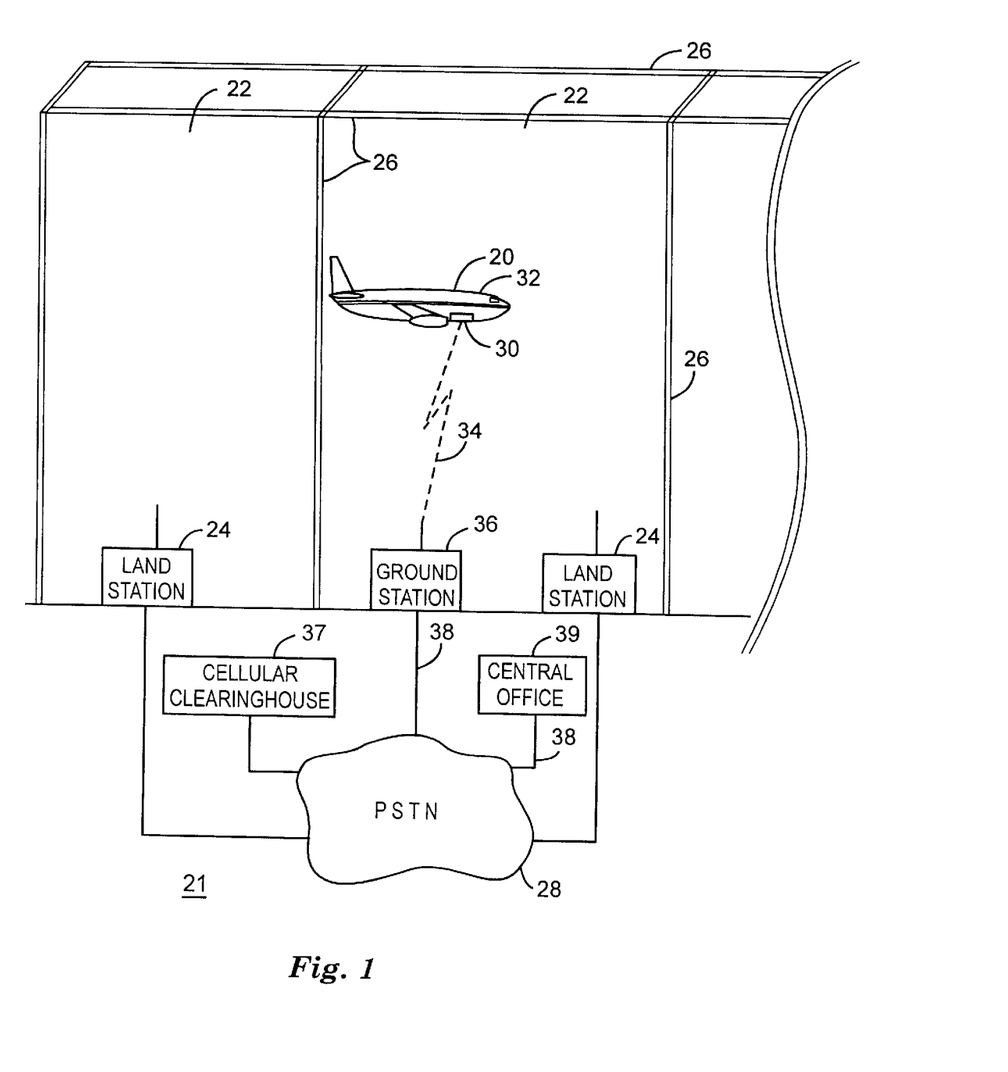
FIG. 1 shows an illustration of an aircraft flying through a network of cellular communication systems.

FIG. 1 illustrates an aircraft 20 flying through a network 21 of cellular communication systems. Network 21 of cellular communication systems may contain a multiplicity of radiotelephones (not shown) communicating through a plurality of cellsites that share common communication channels. The following description is directed to a technique for providing telecommunication services to subscriber-provided radiotelephones residing in aircraft 20. In the preferred embodiment, aircraft 20 is of the type commonly used for public transportation purposes to convey a number of passengers. However, the present invention is not limited to such aircraft. The present invention may also be adapted for use in other vehicles, such as boats and trains, that have a telecommunications system onboard.

Aircraft 20 is illustrated flying through a multiplicity of cells 22 defined by land stations 24. In the preferred embodiment, land stations 24 are fixed-position cellsites or land stations used in the conventional advanced mobile phone service (AMPS) A-side and B-side cellular systems. Land stations 24 share common communication channels and provide non-interfering telecommunication services to a multiplicity of subscriber-provided radiotelephones dispensed throughout network 21. While land stations 24 are illustrated in FIG. 1, cells 22 may be supported by some other transmitting and receiving station such as a satellite. Land stations 24 transmit and receive over a volume of space limited by the cell borders 26. Of course, cell borders 26 are not actually as precisely defined as indicated in FIG. 1. FIG. 1 depicts cells 22 separated by cell borders 26 for simplicity, however, in conventional systems there is overlap between cells 22 along cell borders 26. In addition to overlap along cell borders 26, there may also be an overlay of cells from both A-side and B-side cellular systems. Land stations 24 are connected to mobile telephone switching offices (not shown) via landlines or microwave links. In turn, land stations 24 are connected to the public switched telephone network (PSTN) 28.

A cellular network 30 is located in aircraft 20. Base stations (discussed below) that form part of cellular network 30 transmit and receive through the interior volume of aircraft 20 to form a miniature cellular environment 32. Passenger air-to-ground communications between aircraft 20 and ground locations (not shown) are achieved by transmission from cellular network 30 through a radio communication link 34 to a ground station 36. For simplicity of illustration, only one ground station 36 is depicted, however, a multiplicity of ground stations 36 are desirably established to cover many geographic regions.

In the preferred embodiment, radio communication link 34 consists of at least one pilot signal and a plurality of radio frequency voice channels. Each ground station 36 broadcasts a single pilot signal for the benefit of aircraft 20. This pilot signal informs aircraft 20 of voice channel availability and frequency, and helps aircraft 20 select ground station 36 for optimal, long term reception. Each ground station 36 also uses select voice channels to transmit and receive radio frequency encoded conversations of passengers residing in aircraft 20.

Ground station 36 is coupled to PSTN 28, which is coupled to a cellular clearinghouse 37. Information passes from cellular network 30 through the path just described to cellular clearinghouse 37 for system validation, access authorization, and billing information. Following system validation, PSTN line connections 38 form a pathway for connecting ground station 36 to a central office 39 for call completion and call origination.

Figure 2:
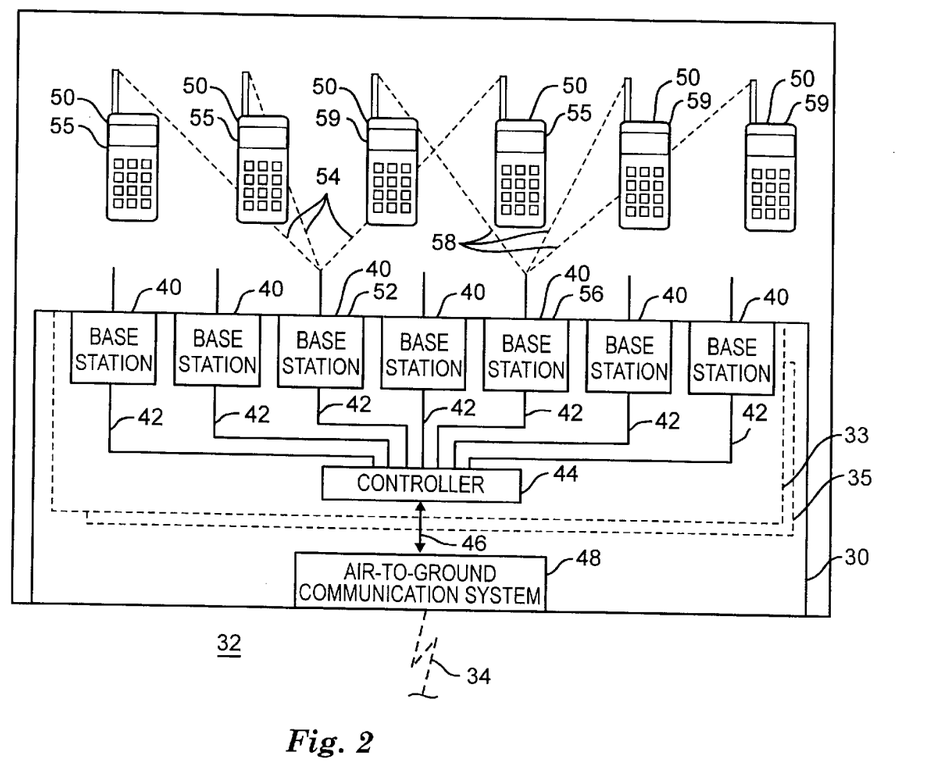
FIG. 2 shows a block diagram of miniature cellular environment located in an aircraft.

FIG. 2 shows a block diagram of miniature cellular environment 32 located inside aircraft 20 (FIG. 1). In conventional AMPS systems a cell may be either an A-side system cell or a B-side system cell. An A-side system cell and a B-side system cell may then be completely or partially overlaid within a single environment. In the preferred embodiment, miniature cellular environment 32 is supported by both a simulated AMPS A-side cellsite 33 and a simulated AMPS B-side cellsite 35. A-side and B-side system cellsites 33 and 35, respectively, combine with conventional air-toground communication system 48 residing in aircraft 20 to form cellular network 30. Air-to-ground system 48 is capable of transmitting via radio communication link 34 to ground station 36 (FIG. 1). A-side cellsite 33 and B-side cellsite 35 together include any number of base stations 40 coupled via connections 42 to a controller 44. Controller 44 controls both A-side and B-side cellsites 33 and 35 and is linked via a bus line 46 to air-to-ground communication system 48 residing in aircraft 20. In the preferred embodiment, controller 44 is a conventional microprocessor based computer system that operates from programs resident in controller 44 memory. Controller 44 also includes a switch fabric (not shown) for selectively connecting base stations 40 to air-to-ground communication system 48 and to each other.

Air-to-ground communication system 48 has several functions. Air-to-ground system 48 can provide an interface to the user/customer in the form of one or more conventional telephones distributed throughout the cabin. Air-to-ground system 48 also includes controls for continually scanning through potential pilot signals to determine the optimal ground station 36. This determination is based upon comparisons of signal strength and Doppler frequency shift error. When a user requests placement of a call on air-to-ground system 48, air-to-ground system 48 selects an available radio frequency voice channel emanating on radio communication link 34 from ground station 36. The present invention describes connections and signal routing through air-to-ground system 48 to support the use of subscriber-provided radiotelephones (discussed below). While the present invention allows the use of borrowed, leased, or owned cellular radiotelephones brought on-board aircraft 20 by a subscriber, it does not remove the capability of using the standard on-board telephones that form part of air-to-ground communication system 48. In the preferred embodiment, air-to-ground communication system 48 is provided by the commercially available Airfone® air-to-ground communication system.

Each of base stations 40 is a single channel, frequency agile station capable of practicing Advanced Mobile Phone Service (AMPS) protocols. This means that base stations 40 can be instructed by controller 44 to tune to a cellular channel on either the A or B side and broadcast a forward control channel overhead data stream which is in accordance with AMPS-compatible subscriber-provided radiotelephones 50 without requiring modifications thereto. Base stations 40 allow controller 44 to receive and send cellular orders to subscriber-provided radiotelephones 50 residing inside miniature cellular environment 32. In the preferred embodiment, each of base stations 40 is an Enhanced Cordless Basestation (ECB) used in a commercially available Tele-Go® dual mode cellular/cordless communication system. However, nothing in the present invention requires the use of multiple ECBs. Another base station design may use a single base station with multiple channel pairs for duplex transmission. Regardless of base station implementation, there desirably exists at least two more channels than the total quantity of available air-to-ground channels. This ensures that there will be two channels available to transmit forward control channel overhead data streams to the radiotelephones 50 residing in miniature cellular environment 32 when all available air-to-ground radio frequency voice channels are in use.

Two overhead data streams are used to control AMPS-compatible subscriber-provided radiotelephones 50 residing in aircraft 20 to substantially prevent interference with standard aircraft 20 transmissions and control. In accordance with conventional AMPS cellular telephony methodology, cellular radiotelephones are subscribers to one of an A-side or B-side system. These radiotelephones are programmed to prefer engaging in communications with the specific home system and system type (either A or B) to which they subscribe. In addition, some radiotelephones may be programmed to engage in communications with only the system type (either A or B) to which they subscribe, so these radiotelephones would not respond to overhead data streams transmitted from the other system type. In the preferred embodiment, radiotelephones 50 that communicate on the A-side system only or have an A-side system preference are defined as A-side preferred radiotelephones 55. Likewise, any radiotelephones 50 that operate on the B-side system only or have a B-side system preference are defined as B-side preferred radiotelephones 59.

Simulated A-side and simulated B-side cellsite base stations 52 and 56, respectively, are two different base stations 40 configured by controller 44 to transmit overhead data streams. In response to instructions from controller 44, simulated A-side cellsite 33 is established when A-side cellsite base station 52 broadcasts an A-side control data pilot signal 54 over a forward control channel (discussed below) to control A-side preferred radiotelephones 55 in environment 32. Likewise in response to instructions from controller 44, simulated B-side cellsite 35 is established when B-side cellsite base station 56 broadcasts a B-side control data pilot signal 58 over a forward control channel (discussed below) to control B-side preferred radiotelephones 59 in environment 32. In the preferred embodiment, simulated A-side and B-side cellsites 33 and 35 are controlled by controller 44 and overlaid within miniature cellular environment 32 (FIG. 1) to engage in communications with respective A-side and B-side preferred radiotelephones 55 and 59 residing in aircraft 20 (FIG. 1).

Radiotelephones 50 transmit within a range between minimum and maximum power levels. A-side control data pilot signal 54 and B-side control data pilot signal 58 instruct A-side preferred radiotelephones 55 and B-side preferred radiotelephones 59 to transmit at minimal power levels. Transmission at minimal power levels minimizes danger of interfering with other aircraft 20 systems. By transmitting an overhead data stream directed to each of A-side preferred radiotelephones 55 and B-side preferred radiotelephones 59, all AMPS radiotelephones 50 residing in aircraft 20 are instructed to operate at minimal power levels including those radiotelephones 50 that communicate on only one system type. While radiotelephones 50 operating at higher power levels are believed to be unlikely to pose a serious danger of interference, by ensuring the control of all A-side and B-side preferred radiotelephones 55 and 59, the likelihood of interference with standard aircraft 20 transmissions and control is reduced considerably.

In the preferred embodiment, controller 44 chooses any one of base stations 40 to broadcast A-side control data pilot signal 54 over a forward control channel to establish simulated A-side cellsite 33. Likewise, controller 44 chooses any other one of base stations 40 to broadcast B-side control data pilot signal 58 over a forward control channel to establish simulated B-side cellsite 35. In addition, controller 44 chooses any of base stations 40 to transmit on a voice channel (not shown) to any one of radiotelephones 50 in response to a call request.

Figure 3:
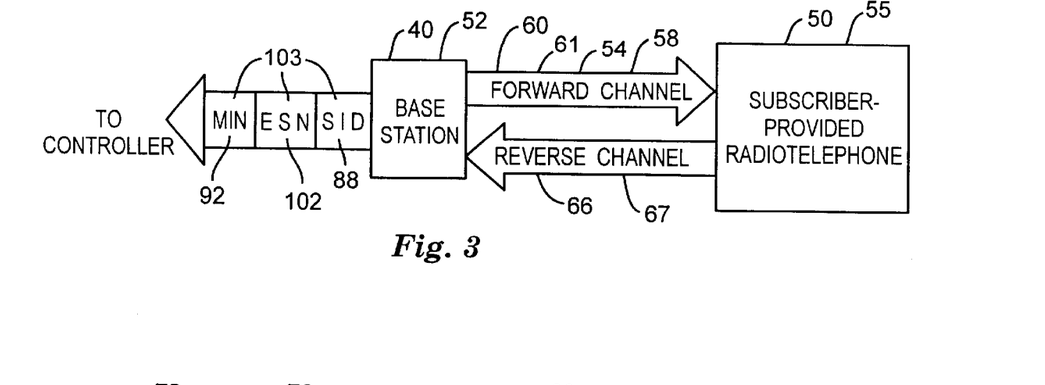
FIG. 3 shows a block diagram depicting two signaling paths used for communication between base stations and subscriber-provided radiotelephones.

FIG. 3 shows a block diagram depicting two signaling paths used in the preferred embodiment for communication between base stations 40 and subscriber-provided radiotelephones 50. A forward channel may be assigned by controller 44 (FIG. 2) as a forward control channel 60 or a forward voice channel 61. A reverse channel may be assigned by controller 44 as a reverse control channel 66 or a reverse voice channel 67. When controller 44 assigns one of base stations 40 to broadcast A-side control data pilot signal 54 or B-side control data pilot signal 58, forward control channel 60 and reverse control channel 66 operate as a duplex circuit to allow control signal transmission in both directions at the same time. Likewise, when controller 44 assigns one of base stations 40 to voice communications, forward voice channel 61 and reverse voice channel 67 operate as a duplex circuit to allow voice signal transmission in both directions at the same time. Control channels are used to set up calls and manage radiotelephones 50 and voice channels are used to communicate voice and other user-provided information for managing calls in miniature cellular environment 32. Data is transmitted on these channels before, after, and during a call. This data may include identification data such as a mobile identification number (MIN) 92 and an electronic serial number ESN 102 that combine with a system identification number (SID) 88 to form an identity code 103 to be conveyed through controller 44 (FIG. 2). The preceding terms will be discussed below.

Figure 4:
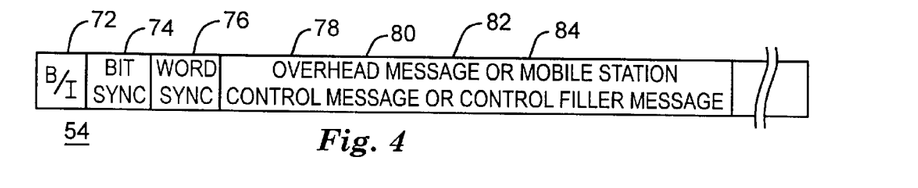
FIG. 4 shows a data format diagram depicting a portion of a control data pilot signal transmitted over a forward channel.

FIG. 4 shows a data format diagram depicting a portion of A-side control data pilot signal 54 transmitted over forward control channel 60 (FIG. 3). Forward control channel 60 is used by A-side cellsite base station 52 (FIG. 2) to broadcast A-side control data pilot signal 54 from controller 44 to A-side preferred radiotelephones 55 (FIG. 2). Likewise forward control channel 60 of B-side cellsite base station 56, assigned to a different dedicated radio frequency control channel, conveys B-side control data pilot signal 58 from controller 44 to B-side preferred radiotelephones 59 (FIG. 2). For simplicity, the following discusses activities taking place at simulated A-side cellsite 33. However, those skilled in the art will realize that similar actions are taking place concurrently at simulated B-side cellsite 35.

In response to orders sent from controller 44, A-side cellsite base station 52 sends A-side control data pilot signal 54 in a continuous overhead stream over forward control channel 60 (FIG. 3). A-side control data pilot signal 54 typically includes busy/idle (B/I) bits 72, a bit sync 74, a word sync 76, and a message data word 78. Each frame of A-side control data pilot signal 54 over forward control channel 60, contains bit sync 74 and word sync 76 to enable A-side preferred radiotelephones 55 to obtain synchronization. In accordance with conventional AMPS cellular telephony practice, busy/idle bits 72 are sent at the beginning of every bit sync sequence, word sync sequence, first repeat of a message data word 78, and every ten message bits thereafter to indicate the current busy/idle status of the corresponding reverse control channel 66 (FIG. 3). Information is sent in message data words 78 which can take the form of one of three types of message including an overhead message 80, a mobile station control message 82, or a control-filler message 84.

Figure 5:
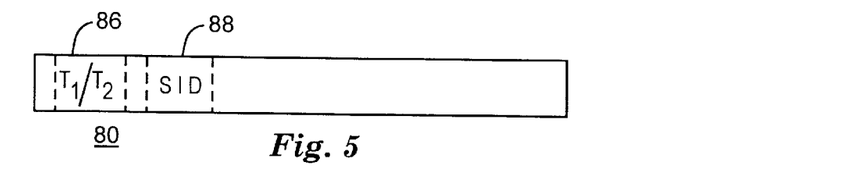
FIG. 5 shows a data format diagram depicting a portion of an overhead message in a control data pilot signal.

FIG. 5 shows a data format diagram depicting a portion of overhead message 80 in A-side control data pilot signal 54 (FIG. 4). Overhead message 80 contains general data from controller 44 that is received by all radiotelephones 55 (FIG. 2). Overhead message 80 is identified by T1/T2 bits 86 set to '11'. Overhead message 80 provides A-side preferred radiotelephones 55 with information such as a system identification (SID) 88 and the identity of access and paging channels that are available in cellular network 30. A system identification number is a five digit number assigned to identify the particular cellular carrier from whom subscriber provided radiotelephones 50 are obtaining service. In general, a system identification number is used by radiotelephones to determine whether they are operating on their "home" system or whether they are "roaming". However, SID 88 identifies a particular cellular carrier associated with aircraft 20. SID 88 is configured within network 21 (FIG. 1) so that no subscriber-provided radiotelephones 50 can claim the system represented by SID 88 as a "home" system. Additional explanation of the particular data fields of overhead message is outside the scope of this detailed description of the preferred embodiment.

Figure 6:
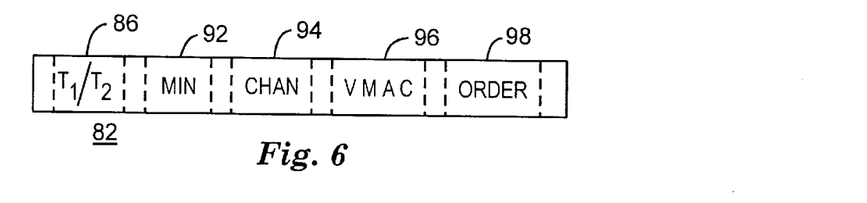
FIG. 6 shows a data format diagram depicting a portion of a mobile station control message in a control data pilot signal.

FIG. 6 shows a data format diagram depicting a portion of mobile station control message 82 in A-side control data pilot signal 54 (FIG. 4). Mobile station control message 82 is sent to tell specific A-side preferred radiotelephones 55 (FIG. 2) what is required of them. Mobile station control message 82 consists of up to four words and is identified by T1/T2 bits 86 set to '00' for one word and set to '01' for multiple words. Mobile station control message 82 contains a Mobile Identity Number (MIN) 92 (discussed below). In addition to MIN 92, depending on the action required there may also be a designated voice channel (CHAN) 94, a Voice Mobile Attenuation Code (VMAC) 96 which controls the power level on reverse voice channel 67 (FIG. 3), and a registration order (ORDER) 98 coded to ensure autonomous registration of A-side preferred radiotelephones 55. Additional fields of mobile station control message 82 are outside the scope of the present discussion.

Figure 7:
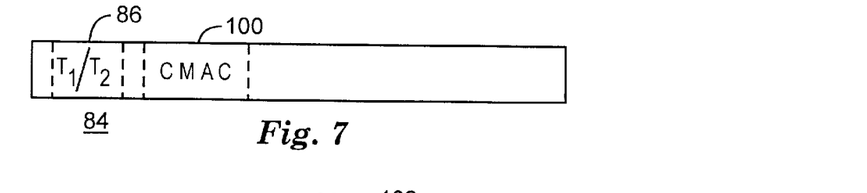
FIG. 7 shows a data format diagram depicting a portion of a control-filler message in a control data pilot signal.

FIG. 7 shows a data format diagram depicting a portion of control-filler message 84 in A-side control data pilot signal 54 (FIG. 4). Control-filler message 84 is a message data word 78 received by all A-side preferred radiotelephones 55 (FIG. 2) to ensure a continuous stream of data on forward channel 60. Control-filler message 84 is identified as an overhead word by T1/T2 bits 86 set to '11'. Control-filler message 84 is sent whenever there is no other message to be sent in A-side control data pilot signal 54. Control-filler message 84 may be inserted between message data words 78 as well as between word blocks of a multi-word message data word 78. Control-filler message 84 is also used to specify a control mobile attenuation code (CMAC) 100 for use by each of A-side preferred radiotelephones 55 accessing cellular network 30 on reverse control channel 66 (FIG. 3). CMAC 100 indicates the desired radiotelephone power level associated with reverse control channel 66 when accessing cellular network 30 through simulated A-side cellsite 33. In the preferred embodiment of the present invention, CMAC 100 instructs A-side preferred radiotelephones 55 to transmit control data for setting up a call at the lowest possible radiotelephone power level when accessing cellular network 30.

Figure 8:
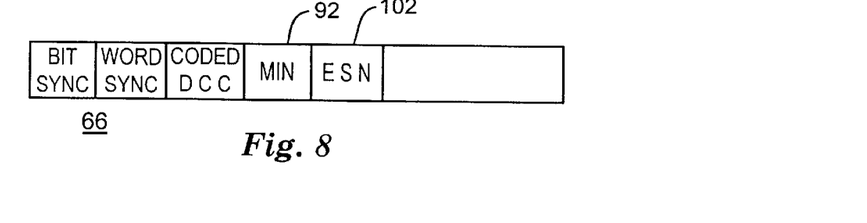
FIG. 8 shows a data format diagram depicting a portion of control data for setting up a call transmitted over a reverse channel.

FIG. 8 shows a data format diagram depicting a portion of control data transmitted over reverse control channel 66 for setting up a call. Reverse control channel 66 is used by A-side preferred radiotelephones 55 (FIG. 2) to convey communication signals to A-side cellsite base station 52 (FIG. 2) and through subsequent links 34 and 38 to PSTN 28 (FIG. 1). Reverse control channel 66 transmits words during radiotelephone registration, call initiation, and call reception containing radiotelephone MIN 92 and a radiotelephone electronic serial number (ESN) 102.

Radiotelephones 50 that have been activated are programmed with a unique mobile identification number (MIN) 92. MIN 92 is a 34 bit binary number derived from a ten digit telephone number. In addition, radiotelephones 50 each have an electronic serial number (ESN) 102 which is a unique number given to each of radiotelephones 50 during manufacture. MIN 92 is semi-permanent and may be reprogrammed as needed, while ESN 102 is permanent and usually not reprogrammable. During activation radiotelephones 50 are programmed with MIN 92, system identification for preferred local A-side service or preferred local B-side service, and other parameters. Each of radiotelephones 50 use this information and ESN 102 to gain access on a preferred A-side or B-side system.

Referring to FIGS. 2–8, when A-side preferred radiotelephones 55 residing in aircraft 20 are powered on, they are forced to register in response to instructions from mobile station control message 82 of A-side control data pilot signal 54 transmitted on forward control channel 60. This is conventionally referred to as autonomous registration. During autonomous registration, radiotelephones 55 perform a system access. This means monitoring busy/idle bits 72 of the A-side control data pilot signal 54 and attempting to seize reverse control channel 66 when it is idle. On seizing reverse control channel 66, radiotelephones 55 send a burst of identification data on reverse channel 66 for processing. This identification data includes MIN 92 and ESN 102. MIN 92, ESN 102, and SID 88 combine to form an identity code 103 (FIG. 3) that is conveyed from A-side cellsite base station 52, through controller 44 to air-to-ground communication system 48. Identity code 103 is then transmitted to ground station 36 (FIG. 1) via radio communication link 34 (FIG. 1) and on to cellular clearinghouse 37 (FIG. 1) for system validation and to establish roaming mode. The validation criteria comprised of system validation and roaming status may be transmitted via radio communication link 34 back through air-to-ground communication system 48 to controller 44 where validation results may be stored.

Figure 9:
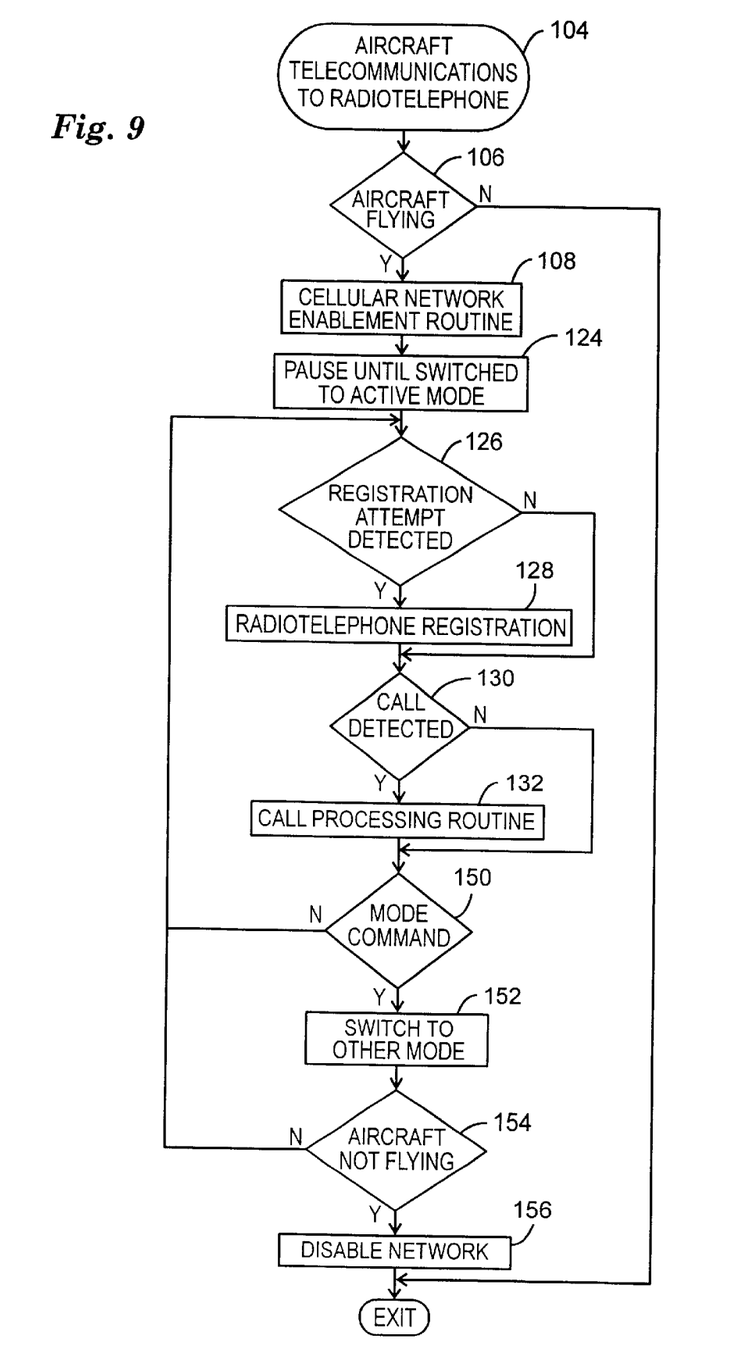
FIG. 9 shows a flow chart of a process for providing aircraft telecommunication services to a subscriber-provided radiotelephone.

FIG. 9 shows a flowchart of a process 104 for providing aircraft telecommunication services to one of subscriber-provided radiotelephones 50. Process 104 causes controller 44 to enable and control cellular network 30 (FIG. 1) desirably throughout a flight profile, when power is applied to controller 44 or when stored programs in controller 44 are initiated. When enabled, cellular network 30 (FIG. 1), having simulated A-side cellsite 33 (FIG. 2), simulated B-side cellsite 35 (FIG. 2), and air-to-ground communication system 48 (FIG. 2), monitors miniature cellular environment 32 (FIG. 1) to detect radiotelephones 50 residing in aircraft 20.

Process 104 provides a technique for allowing a user to place and receive calls on one of subscriber-provided radiotelephones 50 while aircraft 20 is operating in a flying mode. In the preferred embodiment, the flying mode indicates the period of the flight profile when aircraft 20 is moving, including when aircraft 20 is taxiing, taking off, flying, or immediately upon landing. A non-flying mode indicates the time prior to and after the flight profile when aircraft 20 is not moving such as when aircraft 20 is located at an airport gate.

Although this description is limited to one of radiotelephones 50, those skilled in the art will realize that more than one of radiotelephones 50 can conduct calls concurrently. The number of radiotelephones 50 that can place or receive calls at any one time is desirably limited to two less than the total number of base stations 40 residing in aircraft 20. This number of base stations 40 supports two overhead data streams in addition to calls on voice channels of radio communication link 34 (FIG. 1) and seat-to-seat calls within on aircraft 20.

Process 104 begins with a query task 106 which determines the flying or non-flying status of aircraft 20. According to conventional methodologies, air-to-ground communication system 48 (FIG. 2) is disabled while aircraft 20 is in the non-flying mode because communication signals are typically of poor quality. However, while aircraft 20 remains in the non-flying mode subscribers are allowed to conduct calls using subscriber-provided radiotelephones through standard fixed-base land stations 24 (FIG. 1). Such calls result in a higher quality communication signal than air-to-ground communication system 48 provides during the non-flying mode. Just prior to onset of the standard flight profile, subscribers are instructed by crew members to power down radio frequency transmitting devices, such as radiotelephones 50. This is done to guarantee the prevention of interference with standard aircraft 20 transmissions and control. The non-flying mode may be determined automatically by aircraft 20 speed measurements or other aircraft provided data, or may be manually determined by a crewmember. If query task 106 determines that aircraft 20 is in the non-flying mode, aircraft telecommunication services to subscriber-provided radiotelephones 50 are not through network 30 and process 104 is exited.

If query task 106, determines that aircraft 20 is operating in a flying mode, process 104 proceeds to a cellular network enablement routine 108 which enables cellular network 30 so that call setup may occur. While the preferred embodiment of the present invention assumes that routine 108 is performed after aircraft 20 is flying, nothing in the present invention requires task 108 to be performed in-flight.

Figure 10:
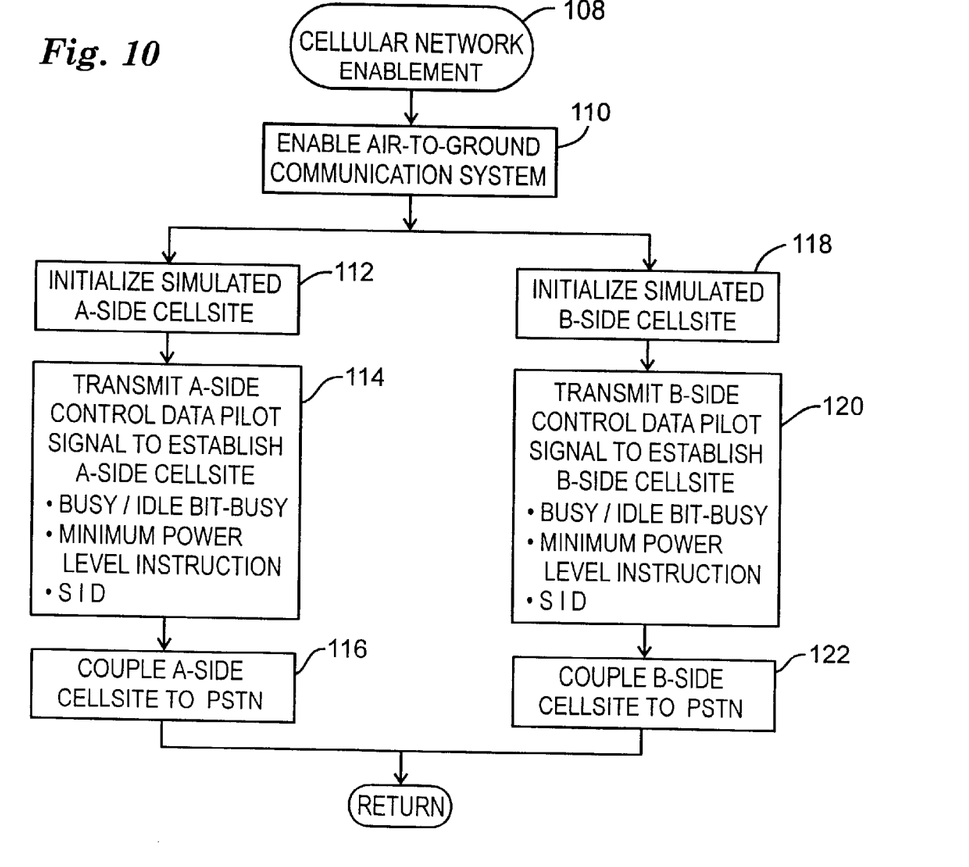
FIG. 10 shows a flow chart of aircraft-based cellular network enablement routine.

FIG. 10 shows a flowchart of aircraft-based cellular network enablement routine 108. Enablement routine 108 is initiated when query task 106 decides that aircraft 20 is flying. Routine 108 may be performed automatically in response to signals received from aircraft 20 instrumentation or may be initiated in response to signals received from a crewmember in aircraft 20. Network enablement routine 108 begins with a task 110 which enables air-to-ground communication system 48 (FIG. 2). Air-to-ground communication system 48, is enabled according to current methodologies not relevant to the present invention.

Following task 110, a task 112 initializes simulated A-side cellsite 33 (FIG. 2). Controller 44 selects A-side cellsite base station 52 from base stations 40, then issues commands to configure and control A-side cellsite base station 52. Controller 44 further instructs A-side cellsite base station 52 to tune to a specific control channel from a set of common communication control channels used by A-side cellular systems.

Following task 112, a task 114 causes A-side cellsite base station 52 to transmit A-side control data pilot signal 54 throughout miniature cellular environment 32 (FIG. 1) over forward control channel 60 (FIG. 3) to establish simulated A-side cellsite 33 within cellular network 30. A-side control data pilot signal 54 contains overhead message 80 (FIG. 4). Overhead message 80 provides general information to all A-side preferred radiotelephones 55 residing in aircraft 20.

Enablement routine 108 enables cellular network 30 in a passive mode. To enable simulated A-side cellsite 33 of cellular network 30 in the passive mode, busy/idle bits 72 (FIG. 4) in A-side control data pilot signal 54 are set to busy. When simulated A-side cellsite 33 is in the passive mode, transmitted overhead message 80 may be received by A-side preferred radiotelephones 55. However, since busy/idle bits 72 are switched to busy, A-side preferred radiotelephones 55 will not access reverse control channel 66 (FIG. 3). Thus, A-side preferred radiotelephones 55 are prevented from placing or receiving a call while simulated A-side cellsite 33 is operating in the passive mode.

In addition to preventing A-side preferred radiotelephones 55 from accessing reverse control channel 66, A-side control data pilot signal 54 contains message data words 78 (FIG. 4) with system identification (SID) 88 (FIG. 5) causing radiotelephones 55 to operate in roaming mode, ORDER code (FIG. 6) coded to force autonomous registration of radiotelephones 55, and control mobile attenuation code (CMAC) 100 (FIG. 7) to instruct radiotelephones 55 to transmit at minimum power levels when attempting to access reverse control channel 66. Thus in the passive mode, A-side preferred radiotelephones 55 will be prevented from conducting calls, but instructed to register and to operate at minimum power levels when an opportunity arises to access reverse control channel 66. Cellular network 30 may be enabled during critical phases of the flight profile. Critical phases of the flight profile may include take-off and landing, taxiing, adverse weather, or other instances when the pilots and aircraft 20 instrumentation are communicating extensively with flight controllers. So, during the critical phases of the flight profile, the likelihood of danger to aircraft and passenger safety from potential interference may be greater. By enabling cellular network 30 in the passive mode, all radiotelephones 50 will be prevented from participating in calls and making undesired radio frequency emissions.

Following task 114, a task 116 couples A-side cellsite base station 52 to PSTN 28 (FIG. 1) through radio communication link 34 (FIG. 1). Radio communication link 34 is accessed by establishing a radio frequency communication link through air-to-ground communication system 48 (FIG. 2).

A task 118, a task 120, and a task 122 may be performed concurrently with tasks 112, 114, and 116. Tasks 118, 120, and 122 initialize simulated B-side cellsite 35 in cellular network 30, transmit B-side control data pilot signal 58 (FIG. 2) to B-side preferred radiotelephones 59 (FIG. 2), and couple simulated B-side cellsite 35 to PSTN 28. Initialization task 118, transmitting task 120, and coupling task 122 are controlled by controller 44 in a similar manner to tasks 112, 114, and 116.

Following enablement of cellular network 30, routine 108 returns program control to a task 124 of process 104 (FIG. 9). Task 124 causes process 104 to pause until cellular network 30 is switched to the active mode from the passive mode that was established in enablement routine 108. Cellular network 30 remains in the passive mode until signaled to switch to the active mode. This activation signal may be provided automatically by aircraft 20 instrumentation or the signal may be provided manually be a crewmember. The signal may be detected by controller 44 when aircraft 20 is no longer in the critical phases of the flight profile, such as when aircraft 20 has reached a certain altitude or when aircraft 20 has flown out of adverse weather. When controller 44 (FIG. 2) is signaled to switch to active mode, controller 44 instructs base station 52 and base station 56 to switch busy/idle bits 72 of their respective A-side and B-side control data signals 54 and 58 to idle, thereby allowing cellular radiotelephones 50 to access reverse control channel 66 (FIG. 3) to conduct calls.

Once cellular network 30 is switched to active mode, process 104 proceeds from task 124 to a query task 126 which monitors miniature cellular environment 32 (FIG. 2) to detect radiotelephones 50 residing in aircraft 20 attempting to register. Controller 44 detects radiotelephone 50 through either A-side cellsite base station 52 or B-side cellsite base station 56 when radiotelephone 50 is activated, or powered up. When powered up, radiotelephone 50 is forced to register in response to A-side control data pilot signal 54 being transmitted from A-side cellsite base station 52 or B-side control data pilot signal 58 being transmitted from B-side cellsite base station 56 depending on radiotelephone 50 A-side or B-side preference. In addition, radiotelephone 50 is instructed to operate at minimum power levels when accessing reverse control channel 66 to register or to initiate a call.

When radiotelephone 50 registration attempt is detected in query task 126, process 104 proceeds to a task 128. In response to A-side or B-side control pilot data signals 54 or 56, radiotelephone 50 transmits information at minimum power levels, including MIN 92 and ESN 102 (FIG. 8) over corresponding reverse control channel 66. MIN 92, ESN 102, and SID 88 are combined to form identity code 103 (FIG. 3). Identity code 103 is then transmitted via controller 44 and air-to-ground communication system 48 (FIG. 2) to cellular clearinghouse 37 (FIG. 1) for system validation. Cellular clearinghouse 37 determines system validation by determining access authorization and billing information for radiotelephone 50. By receiving SID 88, cellular clearinghouse 37 also establishes radiotelephone 50 as a roamer in roaming mode and gains knowledge of a cellular system in which radiotelephone 50 may be reached to receive an incoming call. In this case, that cellular system is in aircraft 20 and may be reached through ground station 36 (FIG. 1). System validation results may then be transmitted back through radio communication link 34 to controller 44 for storage. Following task 128, a query task 130 monitors miniature cellular environment 32 for calls directed toward or being initiated by radiotelephone 50.

If a registration attempt is not detected in query task 126, program control proceeds to task 130, bypassing registration task 126. When task 130 detects a call directed toward or being initiated by radiotelephone 50, a call processing routine 132 is performed.

Figure 11:
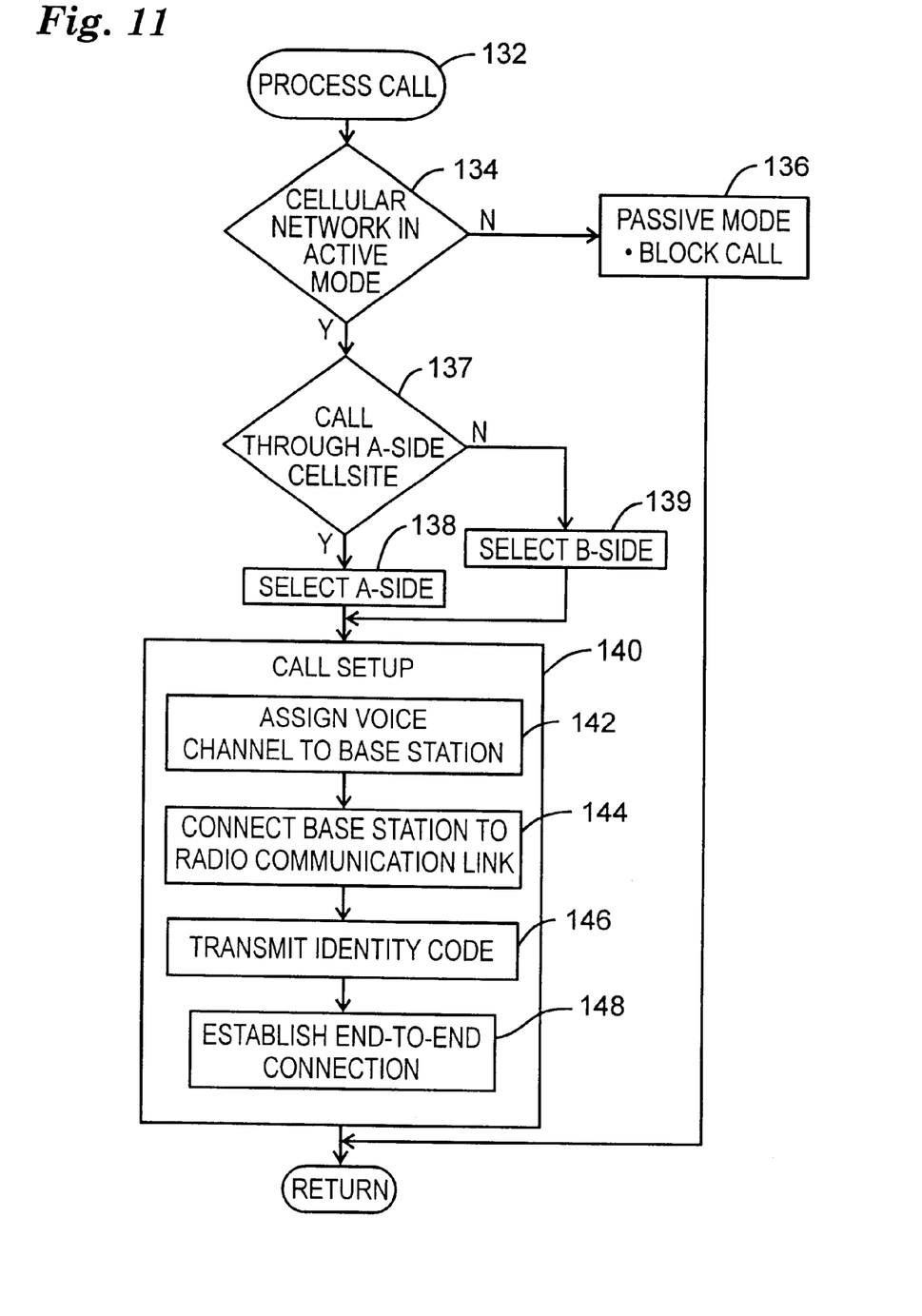
FIG. 11 shows a flow chart of a call processing routine performed to transmit a call from subscriber-provided radiotelephone to a public switched telephone network (PSTN).

FIG. 11 shows a flowchart of call processing routine 132 performed to enable a call between radiotelephone 50 and a called or calling telephone number on a landline or other network (not shown) through PSTN 28. Call process routine 132 begins with a query task 134 to determine if cellular network 30 is in the active mode. Cellular network 30 may not be in the active mode if cellular network 30 is switched to passive mode in a later task and program control has looped back to routine 132. Cellular network 30 may be switched to the passive mode automatically or manually during off-nominal flight operations or at a predetermined time just prior to landing. Even though radiotelephone 50 is in the passive mode, an incoming call may be directed to radiotelephone 50 to cause routine 132 to be performed. In query task 134, when cellular network 30 is not in the active mode it is in the passive mode, and a task 136 causes radiotelephone 50 to refrain from transmitting, thus preventing the call. A call directed toward or initiated by radiotelephone 50 will be blocked when busy/idle bits 72 of forward control channel 60 remain set to busy for an extended period, thus preventing radiotelephone 50 from seizing reverse control channel 66. Following task 136, process call routine 132 returns to a task 150 in process 104 (FIG. 9).

When task 134 determines that cellular network 30 is in the active mode, a query task 137 determines if the call is through simulated A-side cellsite 33 of cellular network 30. If the call is being directed through simulated A-side cellsite 33, a task 138 selects A-side cellsite 33 and control transmissions on forward control channel 60 and reverse control channel 66 take place between radiotelephone 50 (FIG. 2) and A-side cellsite base station 52 (FIG. 2).

Likewise, if query task 137 determines that the call is not directed through simulated A-side cellsite 33, then a task 139 selects B-side cellsite 35 and control transmissions on forward control channel 60 and reverse control channel 66 take place between radiotelephone 50 and B-side cellsite base station 56. Thus, query task 137 determines the transmission path that will be used.

After A-side cellsite 33 is selected in task 138 or B-side cellsite 35 is selected in task 139, routine 132 proceeds to a task 140. Task 140 performs call setup through the selected A-side cellsite base station 52 and radio communication link 34 or B-side cellsite base station 56 and radio communication link 34. Call setup task 140 includes a subtask 142 that assigns one of a set of common voice channels to a selected one of base stations 40 for voice communications. In subtask 142, controller 44 may assign the voice channel to any one of base stations 40, including A-side cellsite base station 52 or B-side cellsite base station 56. If either of base stations 52 or 56 are selected, controller 44 will then assign another one of base stations 40 to perform control tasks previously performed by either A-side cellsite base station 52 or B-side cellsite base station 56.

Following subtask 142, a subtask 144 connects the selected one of base stations 40, assigned in subtask 142, to radio communication link 34 via air-to-ground communication system 48. Radio communication link 34 concurrently supports a predetermined number of radio frequency voice channels. Base stations 40 are collectively and concurrently operable over at least two more than the predetermined number these radio frequency communication channels.

Once connection is established in subtask 144, a subtask 146 transmits the identity code 103 (FIG. 8), consisting of MIN 92, ESN 102, and SID 88, through base station 40 and radio communication link 34 to PSTN 28 (FIG. 1). PSTN 28 routes identity code 103 to cellular clearinghouse 37 (FIG. 1) for verification of validation results and billing management.

After subtask 146, a subtask 148 establishes end-to-end connection by assigning a voice channel to radiotelephone 50 and enabling voice communication. The end-to-end connection may be formed by routing the call through central office 38 (FIG. 1) to the calling or called telephone number on landline networks (not shown). If the call originates in aircraft 20 and is being placed to another telephone (radiotelephone 50, corded, or cordless) residing in aircraft 20, call routing through central office 38 and landline networks are not required, however system validation through cellular clearinghouse 37 may be desirable for billing management. The call is then processed by a switch fabric (not shown) in controller 44 (FIG. 2). The end-to-end connection will continue until the call terminates normally or until cellular network 30 is disabled.

Following call setup task 140, program control returns to a query task 150 of process 104 (FIG. 9). In addition, when query task 130 is negative, program control proceeds to query task 150. Query task 150 determines if a mode command is received. A mode command may be communicated to controller 44 (FIG. 2) automatically in response to normal aircraft 20 activities in the flight profile, such as just prior to landing. It may be desirable to switch cellular network 30 to the passive mode just prior to landing to substantially prevent interfering with standard aircraft 20 transmissions and control. A mode command may also be communicated to controller 44 by a manual command from a crewmember who may toggle the mode between active and passive in response off-nominal flight operations, such as adverse weather or aircraft 20 malfunction. If a mode command is not received in query task 150, program control loops back to query task 126 which determines if radiotelephone 50 is attempting to register.

If a mode command is received in query task 150, a task 152 will switch the state of cellular network 30 to the other mode. To accomplish task 152, controller 44 will instruct A-side cellsite base station 52 and B-side cellsite base station 56 to switch busy/idle bits 72 in each of A-side and B-side control data pilot signals 54 and 58 respectively. Since mode switching only affects the ability of additional radiotelephones 50 to access a reverse channel, switching to the passive mode may optionally include a task (not shown) for terminating previously connected voice communication links. This optional task may include a warning to any radiotelephones 50 currently involved in voice communications that voice communication will be terminated at a predetermined interval of time.

Following task 152, a query task 154 determines the flight or non-flight status of aircraft 20. If query task 154 determines that aircraft 20 is still in the flying mode, program control loops back to query task 126 to continue monitoring for a registration attempt by radiotelephone 50 and to detect a call to directed toward or initiated by radiotelephone 50.

When query task 154 determines that aircraft 20 is not moving or is otherwise in the non-flying mode, such as when aircraft 20 is located at an airport gate, a task 156 disables cellular network 30. Cellular network 30 is disabled by ceasing to transmit A-side and B-side control data pilot signals 54 and 58, so that radiotelephones 50 may now detect pilot channels for cells 22 (FIG. 1). In the non-flying mode, subscribers can be provided with instructions that allow them to use subscriber-provided radiotelephones. Since cellular network 30 is disabled, radiotelephones 50 residing in aircraft 20 may attempt cellular communications through conventional land stations 24 (FIG. 1) located proximate to the airport at which aircraft 20 is located. By utilizing conventional land stations 24, subscribers may attain higher quality communication signals through radiotelephones 50.

In summary, the present invention provides a method for providing aircraft telecommunication services to any number of subscriber-provided radiotelephones residing in an aircraft. The present invention extends this service to existing subscriber-provided radiotelephones without modification to the subscriber-provided radiotelephones to conveniently provide high quality communication signals. Additionally, all radiotelephones residing in a vehicle are controlled such that the radiotelephones are transmitting at minimal power levels so that interference to vehicle systems is substantially prevented.

Although the preferred embodiments of the invention have been illustrated and described in detail, it will be readily apparent to those skilled in the art that various modifications may be made therein without departing from the spirit of the invention or from the scope of the appended claims. For example the present invention may be adapted to function with evolving digital cellular phone services such as code division multiple access (CDMA) and time division multiple access (TDMA) technologies instead of, or in addition to, the AMPS system described herein.

What is claimed is:

1. In a network of cellular communication systems in which a multiplicity of subscriber-provided radio communication devices communicate over a wide region through a plurality of cellsites that share common communication channels, a method of controlling telecommunication services to said subscriber-provided radio communication devices residing in an area, said area being inside of and smaller than said region, said method comprising the steps of:

providing one of said cellsites in said area;

establishing a forward communication portion of said cellsite in said area, said forward communication portion simulating forward communication over one of an A-side and a B-side cellular communications system; and operating said forward communication portion in a passive mode to prevent said subscriber-provided radio communication devices residing in said area from transmitting, said operating step including:

broadcasting a control data pilot signal over a forward control channel of said common communication channels, said forward control channel being a forward control channel for said one of said A-side and B-side systems, and said control data pilot signal instructing said subscriber-provided radio communication devices residing in said area to refrain from transmitting; and setting a busy/idle bit of said control data pilot signal to busy prior to said broadcasting step.

2. A method as claimed in claim 1 wherein said method additionally comprises the step of establishing a second forward communication portion in said area, said second forward communication portion simulating forward communication over a second one of said cellular communications systems, said second one of said cellular communications systems being the other of said A-side and B-side cellular communications systems.

3. In a network of cellular communication systems in which a multiplicity of subscriber-provided radio communication devices communicate over a wide region through a plurality of cellsites that share common communication channels, a method of controlling telecommunication services to said subscriber-provided radio communication devices residing in an area, said area being inside of and smaller than said region, said method comprising the steps of:

providing one of said cellsites in said area;

establishing a forward communication portion of said cellsite in said area, said forward communication portion simulating forward communication over one of an A-side and a B-side cellular communications system; and operating said forward communication portion in a passive mode to prevent said subscriber-provided radio communication devices residing in said area from transmitting, said operating step including the steps of:

setting a busy/idle bit of a control data pilot signal to busy; and broadcasting said control data pilot signal over a forward control channel of said common communication channels;

switching said forward communication portion to operate in an active mode, said switching step including setting said busy/idle bit of said control data pilot signal to idle;

establishing a reverse communication portion of said cellsite in said area, said reverse communication portion simulating reverse communication over said one of said A-side and said B-side cellular communications system; and setting up a call with one of said subscriber-provided radio communication devices residing in said area, said call being set up through said cellsite using said common communication channels, wherein said setting up a call step occurs when said forward communication portion operates in said active mode.

4. A method as claimed in claim 3 further comprising the steps of coupling said cellsite to a public switched telecommunication network (PSTN) through a communication link, said call being set up through said cellsite, said communication link, and said PSTN.

5. A method as claimed in claim 3 wherein said control data pilot signal instructs said subscriber-provided radio communication devices residing in said area to transmit to said cellsite at minimum power levels for said subscriber-provided radio communication devices.

6. An apparatus that controls telecommunication services to subscriber-provided radio communication devices residing in an area, said subscriber-provided radio communication devices being configured to communicate over a wide region through a plurality of cellsites that share common communication channels, said area being inside of and smaller than said region, and said apparatus comprising:

a base station transmitter having an antenna located inside said area and configured to communicate over at least a portion of said common communication channels, said base station transmitter being configured to simulate forward communication over an A-side system;

a controller coupled to said base station transmitter and configured to control said base station transmitter, wherein said controller operates in a passive mode to cause said base station transmitter to transmit a control data pilot signal which prevents said subscriber-provided radio communication devices residing in said area from transmitting, said control data pilot signal instructing at least a portion of said subscriber-provided radio communication devices residing in said area to refrain from transmitting; and a second base station transmitter coupled to said controller and having an antenna located inside said area, said second base station transmitter being configured to communicate over at least a portion of said common communication channels and simulate forward communication over a B-side system, wherein said controller controls said second base station transmitter to cause said second base station transmitter to transmit a second control data pilot signal which instructs at least a portion of said subscriber-provided radiotelephones residing in said area to refrain from transmitting when said controller operates in said passive mode.

7. A system that controls telecommunication services to subscriber-provided radio communication devices residing in an area, said subscriber-provided radio communication devices being configured to communicate over a wide region through a plurality of cellsites that share common communication channels, said area being inside of and smaller than said region, and said apparatus comprising:

a first base station having a first antenna located inside said area and configured to communicate over a first portion of said common communication channels, said first base station being configured to simulate forward communication over an A-side system, and said first base station transmitting a first control data pilot signal which instructs a first portion of said subscriber-provided radio communication devices residing in said area to refrain from transmitting; and a second base station having a second antenna located inside said area and configured to communicate over a second portion of said common communication channels, said second base station being configured to simulate forward communication over a B-side system, and said second base station transmitting a second control data pilot signal which instructs a second portion of said subscriber-provided radio communication devices residing in said area to refrain from transmitting.

* * * * *